United States Patent

Barbehenn

[11] Patent Number: 5,929,789
[45] Date of Patent: Jul. 27, 1999

[54] SINGLE CHANNEL INCREMENTAL POSITION ENCORDER WITH INCORPORATED REFERENCE MARK

[75] Inventor: George Barbehenn, Vancouver, Wash.

[73] Assignee: Hewlett-Packrd Company, Palo Alto, Calif.

[21] Appl. No.: 08/840,079

[22] Filed: Apr. 9, 1997

[51] Int. Cl.[6] ............................. H03M 1/30; G01D 5/34
[52] U.S. Cl. ........................................ 341/11; 250/231.17
[58] Field of Search .................. 341/11, 13; 250/231.14, 250/231.17

[56] References Cited

U.S. PATENT DOCUMENTS

| | | | |
|---|---|---|---|
| 4,360,769 | 11/1982 | Selkey et al. ............................. | 341/13 |
| 4,421,980 | 12/1983 | Kühne ....................................... | 341/13 |
| 4,717,824 | 1/1988 | Sakamoto et al. ......................... | 341/13 |
| 4,786,803 | 11/1988 | Majette et al. . | |
| 4,789,874 | 12/1988 | Majette et al. . | |
| 5,130,536 | 7/1992 | Sato et al. ............................ | 250/231.17 |
| 5,206,645 | 4/1993 | Urich ........................................ | 341/11 |
| 5,331,154 | 7/1994 | Kondo et al. ....................... | 250/231.17 |
| 5,426,457 | 6/1995 | Raskin . | |
| 5,457,371 | 10/1995 | Gordon . | |
| 5,837,999 | 11/1998 | Horiuchi ............................. | 250/231.14 |

OTHER PUBLICATIONS

Hewlett–Packard Model 3820A, Electronic Total Station, Service Manual, Hewlett–Packard Company 1979.

Primary Examiner—Howard L. Williams

[57] ABSTRACT

A position encoder system is provided, the system employing a medium having a track with incremental markings which define an embedded reference position identifier. Upon movement of the medium, a sensor detects passage of the incremental markings, each such marking being indicative of a predetermined movement of the medium. The sensor also detects the embedded reference position identifier, and correspondingly, provides a recognizable index pulse for use in determining an absolute position of the medium.

15 Claims, 2 Drawing Sheets

SINGLE CHANNEL INCREMENTAL POSITION ENCORDER WITH INCORPORATED REFERENCE MARK

TECHNICAL FIELD

The present invention relates generally to position encoders, and more particularly, to a position encoder which is indexed by provision of a code wheel or code strip with incremental markings which define an embedded reference position identifier. Although the invention has broad utility, it has proven particularly well-suited for use in printers, and is described in the context of an ink-jet printer below.

BACKGROUND ART

In a conventional ink-jet printer, sheet media is drawn through the printer via a feed mechanism which employs one or more feed rollers to direct sheets through the printer along a predetermined sheet media path. The rollers typically are configured to frictionally engage media within an input tray, consecutive sheets being pulled from the input tray and directed into a print zone where printing occurs. The rollers are moved with precision, promoting accurate placement of the sheet, and correspondingly, accurate placement of an image on the sheet.

Print quality thus is dependent on accurate identification of roller position, a task which typically is performed using a position encoder or the like. Such position encoders generally employ one or more sensors which identify incremental markings along a track of an adjacent code wheel (or code strip). The code wheel (typically a disc) is mounted for rotation with the feed roller, preferably about a central axis of both the feed roller and the code wheel. As the code wheel rotates, the sensor and attendant structure count the number of incremental markings which pass, each marking being indicative of a predetermined angular movement of the code wheel. Accordingly, it is possible to identify relative movements of the code wheel, of the rollers, and of the sheet which is carried thereby.

One problem with conventional position encoders has related to difficulties in identifying the absolute position (as opposed to relative position) of the code wheel. It will be appreciated, for example, that a conventional position encoder simply counts incremental changes in the position of the code wheel. It provides no reference by which the actual position of the code wheel may be identified. Such information, however, is important to addressing inherent encoder positioning errors (e.g. code wheel eccentricity), and correspondingly, is important to ensuring proper placement of an image on the sheet.

In the past, the aforementioned problem has been addressed by generating an index pulse for detection by an index pulse detector which is independent of the code wheel. The index pulse, it will be appreciated, is indicative of a predetermined position of the rollers and/or the to-be-printed sheet. Although potentially effective, this approach typically requires sophisticated optics, and requires that the index pulse be correlated to a precise position of the code wheel. These requirements increase complexity of the encoder and may be cost prohibitive in many commercial printer applications.

Another approach has been to add another track to the code wheel, and to add a corresponding channel to the position encoder. The position encoder thus is provided with a separate indexing subsystem which identifies a reference position of the code wheel. However, because the system employs separate indexing and incrementing subsystems, additional circuitry is required. Accordingly, this approach increases both the complexity of the position encoder, and the printer's overall cost.

What is needed is a position encoder system which is capable of identifying an absolute position of the code wheel without significantly increasing the complexity or cost over a conventional incremental encoder.

SUMMARY OF THE INVENTION

The foregoing problems are addressed by provision of a position encoder system having a track with incremental markings which define an embedded reference position identifier. Upon movement of the track, a sensor detects passage of the incremental markings, each such marking being indicative of a predetermined movement of the track. The sensor also detects the embedded reference position identifier, and correspondingly, provides a recognizable index pulse relative to which absolute position of the track is defined.

In a printer, the track typically is formed on a code wheel which is mounted for rotation with the printer's feed rollers such that angular movements of the code wheel correspond to angular movements of the rollers, and thus to movements of an associated sheet. As code wheel rotates, the sensor detects passage of incremental markings, and produces a corresponding pair of phase-shifted periodic waveforms which may be used to quantify movement of the code wheel. The sensor also detects the embedded reference position identifier, preferably by identification of a predetermined variation in waveform peak amplitudes. Such variation may be achieved by altering a predetermined characteristic of one or more incremental markings (e.g., by increasing opacity of a selected marking). The altered marking or markings thus may be considered to define a reference position of the code wheel relative to which an absolute position of the code wheel is defined.

These and other objects and advantages of the present invention will be understood more readily upon consideration of the drawings and the detailed description of the preferred embodiment which is set forth below.

DETAILED DESCRIPTION OF THE PREFERRED EMBODIMENT AND BEST MODE FOR CARRYING OUT THE INVENTION

Figure 1:
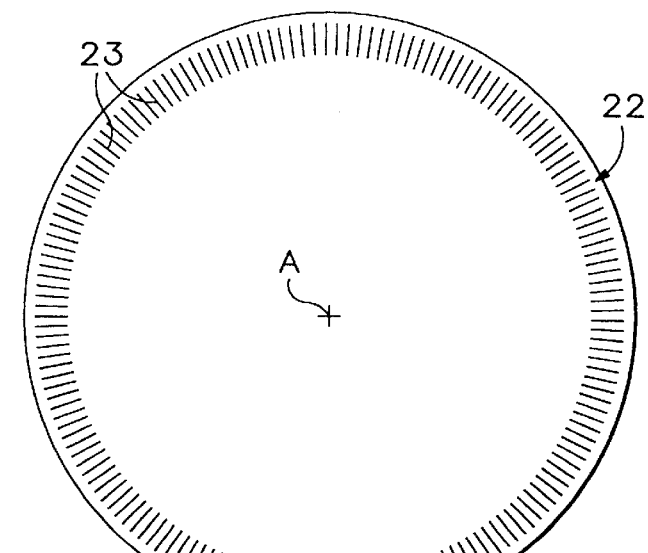
FIG. 1 is a somewhat schematic view of a position encoder system constructed in accordance with a preferred embodiment of the invention.

Referring initially to FIG. 1, a position encoder system constructed in accordance with a preferred embodiment of the invention is shown generally at 10, such system employing a tracking medium which is movable with a to-be-tracked object in order to define the position thereof.

Although the depicted system has broad utility, it is described herein for use in a device such as an ink-jet printer where accurate determination of feed roller position is required. It will be appreciated, for example, that inaccurate determination of feed roller position may lead to a variety of problems, including color banding, improper spacing, or even overlap of printed lines of text.

As indicated, the depicted position encoder system is configured for use in determining the angular position of a printer's feed rollers (not shown), the rollers typically being configured to rotate about an axis A. In the depicted embodiment, this is accomplished using a tracking medium in the form of a code wheel 20 (preferably a disc), also mounted for rotation about axis A. The code wheel typically is linked to the feed rollers, providing for tracking of feed roller movements by tracking corresponding movements of the code wheel.

Code wheel 20 defines a track 22 which extends about the perimeter of the disc as a series of incremental markings 23. The markings are closely-spaced, and equally-spaced, each mark representing a predetermined increment of travel along the perimeter of the code wheel. Accordingly, the markings may be surveyed to identify incremental angular movements of the code wheel. This, in turn, may be used to determine a relative position of the code wheel (the code wheel's current position relative to its previous position) and of the associated feed rollers (not shown).

The encoder also is provided with a sensor 30 which detects passage of incremental markings as the code wheel rotates. The sensor (typically an optical sensor) produces a pair of phase-shifted periodic outputs 32, 34, each having a frequency corresponding to the resolution of incremental markings along the track. The period of each output is 1/N, where N is the number of incremental markings along the track. Each period corresponds to a predetermined movement of the code wheel between an initial position wherein the sensor identifies an initial marking and a subsequent position wherein the sensor identifies a next adjacent marking. Consecutive markings thus are identified by adjacent periods of the referenced waveform.

Figure 3:
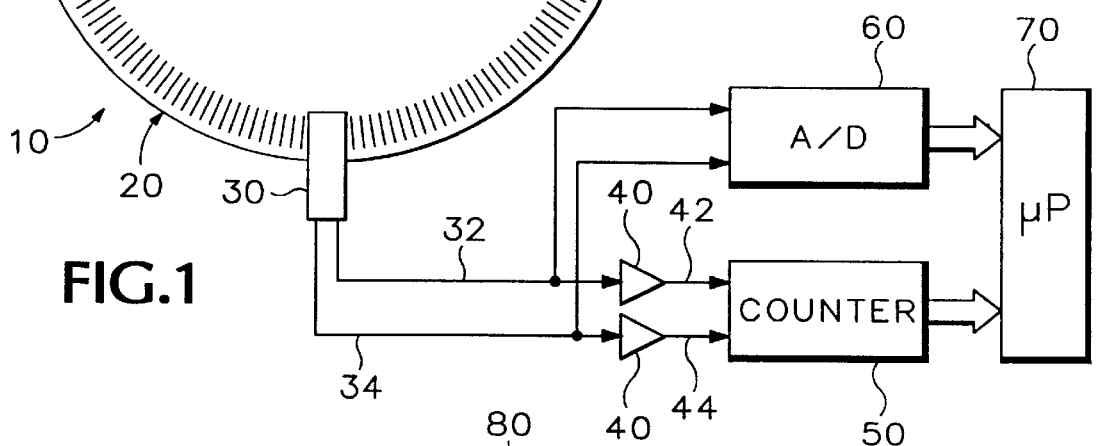
FIG. 3 shows exemplary analog waveforms produced by a sensor which forms a part of the position encoder system depicted in FIG. 1.

The sensor outputs typically are 90-degree-phase-shifted analog signals, each being characterized by a generally sinusoidal waveform (FIG. 3). Because the signals are phase-shifted, those skilled will appreciate that it is possible to differentiate between corresponding points (i.e., points with the same amplitude) along rising and falling edges of the sinusoidal waveforms. Using this differentiation, and the signal amplitudes, it is possible to identify all points within a given period of the waveform. The phase-shifted sensor outputs thus accommodate fractional quantification of the incremental markings, and correspondingly, allow for identification of continuous positions of the code wheel.

Figure 4:
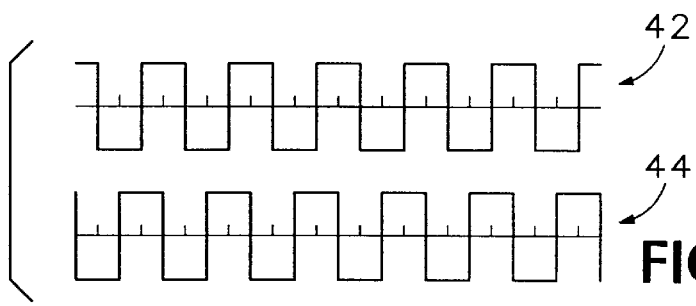
FIG. 4 shows exemplary digital waveforms derived from the analog waveforms of FIG. 3.

Referring still to FIG. 1, it will be noted that each sensor output is passed through an amplifier 40 to an up/down counter 50, which preliminarily quantifies the incremental markings. As indicated, the amplifiers typically receive the sensor outputs as sinusoidal signals (FIG. 3), but produce corresponding amplifier outputs 42, 44 in the form of square wave signals (FIG. 4) for subsequent input to counter 50. The amplifiers similarly may be employed to convert other analog waveforms (e.g. triangle wave signals) to square wave signals for input to the counter. The counter thus is able to count the number of incremental markings, and to pass the count on to a microprocessor 70 (referred to in the drawings as "μP") for further quantification.

In the preferred embodiment, the counter counts both rising and falling edges of the square wave signals (both signals), increasing resolution of the encoder relative to resolution of the incremental markings along the track. The counter thus will count four times during passage of each incremental marking. Resolution is further enhanced by considering the amplitudes of the sensor outputs, such amplitudes generally being non-repetitive along predetermined portions of the waveforms (e.g. those portions of the sinusoidal signal corresponding to the times between consecutive rising and falling edges of the square wave signals).

The sensor outputs also are communicated to an analog-to-digital converter 60 (referred to in the drawings as "A/D") so as to provide digital representations of the signal amplitudes. The signal amplitudes are passed on to microprocessor 70 for use in further quantification (fractional quantification) of the incremental markings of the code wheel. Accordingly, the amplitudes of the sensor outputs, in combination with the count produced by counter 50, allow for identification of virtually any code wheel position along the code wheel's rotation path.

To identify absolute positions of the code wheel, the encoder employs a reference position indicator which may be used to index movements of the code wheel. The reference position indicator is defined by the code wheel, typically being embedded in or more incremental markings thereof. Code wheel position thus may be defined relative to a reference position which remains constant for successive printer operations. Furthermore, once the reference position of the code wheel has been identified, it is possible to identify subsequent absolute positions of the rollers based on detected incremental movements of the code wheel.

In the depicted embodiment, the reference position indicator is defined along track 22, one or more of the incremental markings being adapted to denote an index relative to which positions of other markings may be defined. Identification of an absolute code wheel position thus may be accomplished by quantification of markings detected by the sensor subsequent to the sensor detecting the reference position indicator. It will be understood, however, that the reference position indicator is transparent to quantification of the markings, and accordingly, that the absolute position of the code wheel may be determined without compromising resolution of the code wheel.

Figure 2:
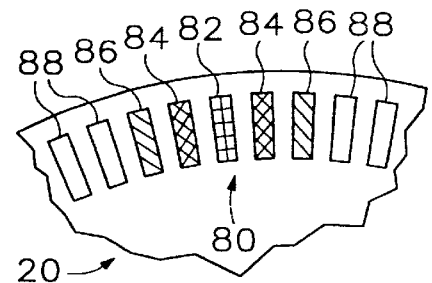
FIG. 2 is an enlarged fragmentary view of a code wheel which forms a part of the position encoder system depicted in FIG. 1.

An enlarged fragment of code wheel 20 is shown in FIG. 2, such fragment including a portion of the above-described code wheel track. As indicated, the track is defined by a plurality of equally-spaced incremental markings, each of which takes the form generally of a transparent (or translucent) trapezoid. The sensor thus may identify incremental markings by producing an output in response to passage of light through the transparent markings. The output takes the form of a pair of phase-shifted sinusoidal signals 32, 34 (FIG. 3) which may be converted by amplifiers 40 to square wave signals 42, 44 (FIG. 4) for use in quantifying the incremental markings as is herein described.

According to the present invention, the code wheel may be adapted to convey additional information, typically by altering a predetermined characteristic of the code wheel. For example, where an optical sensor is employed, information may be provided by shaping the optical density of the code wheel. This typically is accomplished by providing for differentiated opacity of one or more incremental markings. The code wheel markings thus may be considered to include an embedded reference position indicator 80 which identifies a reference position (or index) relative to which code wheel position may be defined. Although only a single reference position indicator is depicted, those skilled will appreciate that additional indicators may be employed for use in providing additional information (positional or otherwise).

Differentiated opacity of the incremental markings results in corresponding changes in attributes of output signals 32, 34. Typically, the changes will be embodied by a differentiation of peak amplitudes of the sensor output signals. This differentiation in peak amplitudes is detected by analog-to-digital converter 60, and communicated to microprocessor 70 for interpretation.

In the preferred embodiment, the reference position indicator is defined by a series of markings of differentiated opacity, such markings being configured to direct the sensor to produce sensor output signals with peak amplitudes which vary with opacity of the marking. Accordingly, as opacity of the markings varies, the peak amplitudes of the sensor output signals may fall (or rise) to a level outside a predetermined peak amplitude range. The peak amplitude range of the depicted position encoder system is selected to accommodate identification of a marking having an opacity above a predetermined opacity threshold. Preferably, that threshold is exceeded when a marking is more than approximately 50-percent opaque. Incremental marking 82, for example, is approximately 75-percent opaque, resulting in an output signal pulse 92 with a peak amplitude which is outside (below) the predetermined peak amplitude range.

The incremental markings which surround marking 82 also may be somewhat opaque, providing for a graduated transition from transparent markings to a substantially opaque index marking. Accordingly, marking 82 is approximately 75-percent opaque, markings 84 are approximately 50-percent opaque, markings 86 are approximately 25-percent opaque, and markings 88 are substantially transparent. The remaining markings (extending around the perimeter of the code wheel) also are substantially transparent.

In one embodiment of the invention, peak amplitudes of adjacent output signal pulses are averaged by microprocessor 70, the average peak amplitude providing a more reliable indication of an index pulse. It will be understood, for example, that the sensor may miss a single incremental marking, but is less likely to miss a series of markings which have an average peak amplitude below a predetermined level. However, because the opacity of the markings transitions as described above, the indexing resolution of the encoder remains unchanged.

In any event, incremental marking 82 is defined with an opacity which is noticeably higher than the opacity of surrounding incremental markings 84, 86, 88. Correspondingly, marking 82 will allow passage of less light than will be allowed by the surrounding incremental markings. Accordingly, sensor 30 will produce sinusoidal output signals 32, 34 (FIG. 3), at least one of which includes an index pulse 92 having a peak amplitude which is noticeably lower than the peak amplitudes of surrounding pulses 94, 96, 98. The index pulse thus may be used to identify a reference position relative to which future positions of the code wheel are defined. When the microprocessor detects a peak amplitude below a predetermined level, the code wheel's reference position is defined.

Those skilled in the art will recognize that varied opacity of the incremental markings is but one method of recording information on the code wheel. It will be appreciated, for example, that changing the shape or size of the markings may have a similar effect. Also, it may be possible to shape unused portions of the output signals (e.g. peak regions) to convey other information to the microprocessor.

Figure 5:
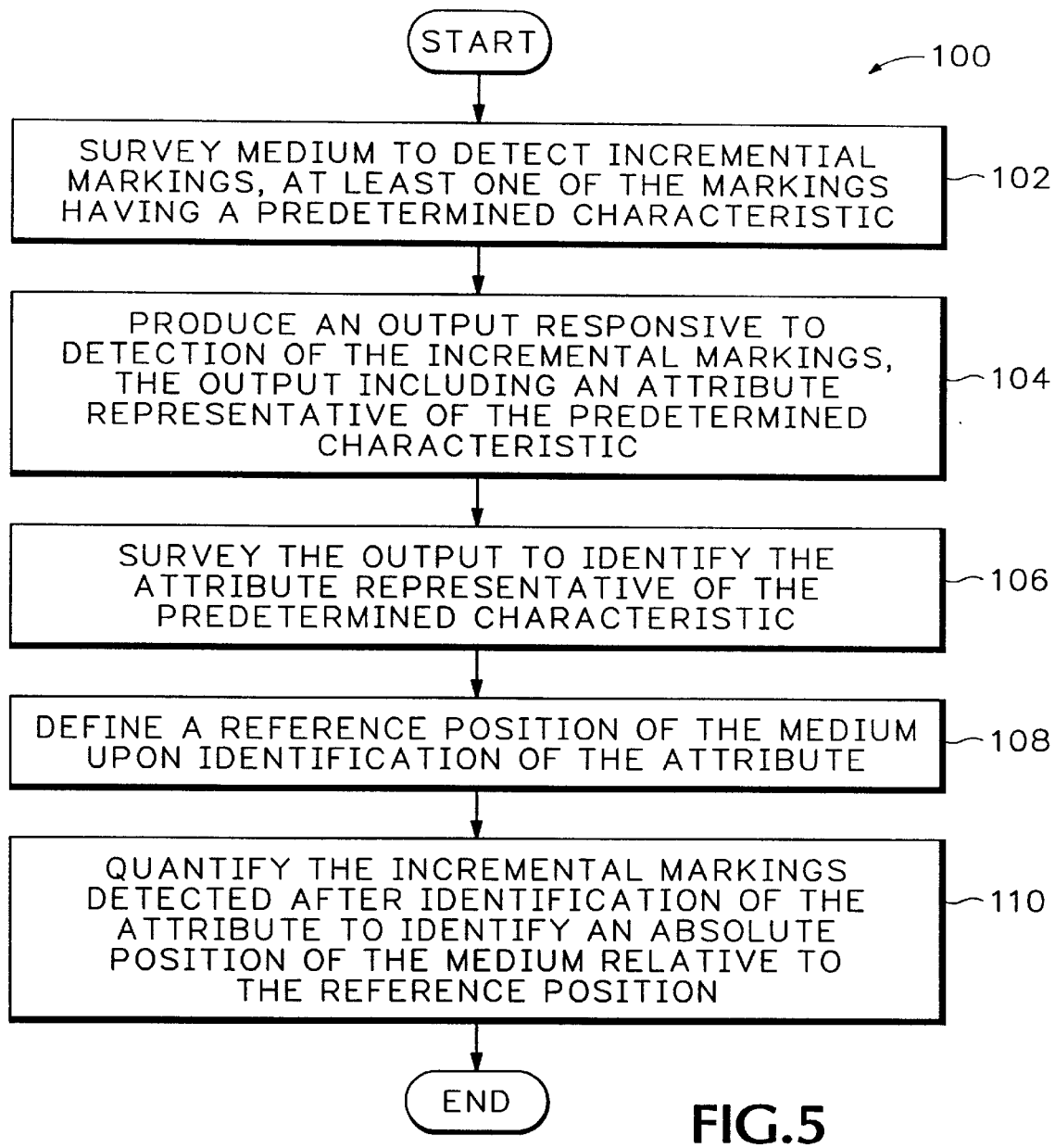
FIG. 5 is a flowchart demonstrating a method of indexing a position encoder system in accordance with a preferred embodiment of the invention.

The foregoing system thus follows a method set forth generally at 100 in FIG. 5. The method provides for identification of the absolute position of an object, the method including steps of: (1) surveying a tracking medium to detect incremental markings upon relative movement of the tracking medium, at least one of the markings having a predetermined characteristic (shown generally at 102); (2) producing an output responsive to detection of the incremental markings, the output including an attribute representative of the predetermined characteristic (shown generally at 104); (3) surveying the output to identify the attribute representative of the marking with the predetermined characteristic (shown generally at 106); (4) defining a reference position of the medium upon identification of the attribute (shown generally at 108); and (5) quantifying the incremental markings which are detected after identification of the attribute to identify an absolute position of the tracking medium relative to the reference position (shown generally at 110).

In the present embodiment, the predetermined attribute is opacity. Upon identifying a marking (or series of markings) having an opacity within a predetermined range, a reference position is defined and quantification of the incremental markings begins. The markings typically are quantified by conversion of the sinusoidal sensor output signals to square wave signals which may be input to a counter. The sensor output signals also are communicated to an analog-to-digital converter so as to provide digital representations of the signal amplitudes. A microprocessor then receives data from the counter and the analog-to-digital converter for use in fractional quantification of the markings. This in turn may be used to define absolute position of the code wheel.

While the present invention has been shown and described with reference to the foregoing operational principles and preferred embodiment, it will be apparent to those skilled in the art that other changes in form and detail may be made therein without departing from the spirit and scope of the invention as defined in the appended claims. It will be understood, for example, that the aforementioned code wheel may instead take the form of a code strip including incremental markings which define a linear track. The linear track thus may be adapted to move such that a sensor may detect the incremental markings to identify predetermined linear movements of the code strip.

We claim:

1. A position encoder system comprising:
   a track having uniform-size incremental markings, a predetermined one of said incremental markings having a unique opacity characteristic;
   a sensor configured both to detect incremental markings along said track upon relative movement of said track and to identify the predetermined one of said incremental markings with said unique opacity characteristic; and
   a counter operatively connected to said sensor to quantify incremental markings detected by said sensor after identification of said unique opacity characteristic.

2. The position encoder system of claim 1, wherein said sensor produces an output signal having pulses with peak amplitudes representative of opacity of said incremental markings.

3. The position encoder system of claim 2, wherein said predetermined one of said incremental markings is approximately 75-percent opaque.

4. The position encoder system of claim 3, wherein opacity of said incremental markings transition from transparent to approximately 75-percent opaque in a plurality of graduated steps.

5. The position encoder system of claim 3, wherein all but said predetermined one of said incremental markings are less than approximately 50-percent opaque.

6. The position encoder system of claim 2, wherein each pulse of said output signal represents a predetermined relative movement of the track.

7. The position encoder system of claim 6, wherein said counter quantifies incremental markings by counting said output signal pulses.

8. A position encoder comprising:

a movable medium including a track with equally-spaced uniform incremental markings, at least one of which has an opacity defining an embedded reference position identifier;

a sensor adapted to detect passage of said incremental markings upon movement of said track, said sensor producing an output signal having pulses of uniform duration and representative of detected incremental markings, each pulse representing a predetermined relative movement of the movable medium, and at least one of said pulses having a peak amplitude indicative of identification of said embedded reference position identifier; and a processor operatively connected to said sensor, said processor being adapted to recognize a pulse having said attribute indicative of identification of said embedded reference position identifier, the recognized pulse defining a reference position from which movement of said movable medium may be quantified.

9. The position encoder of claim 8, wherein said attribute is a peak amplitude outside of a predetermined peak amplitude range.

10. The position encoder of claim 8, wherein said attribute is a peak amplitude below a predetermined threshold.

11. The position encoder of claim 8, wherein said sensor produces an output signal having pulses with peak amplitudes representative of opacity of said incremental markings.

12. The position encoder of claim 11, wherein a predetermined one of said incremental markings is more than approximately 50-percent opaque.

13. The position encoder of claim 12, wherein all but said predetermined one of said incremental markings are less than approximately 50-percent opaque.

14. The position encoder of claim 13, wherein opacity of said incremental markings transitions from transparent to more than approximately 50-percent opaque in a plurality of graduated steps.

15. The position encoder of claim 8, wherein each pulse of said output signal represents a predetermined relative movement of the movable medium.

* * * * *